United States Patent
Park et al.

(10) Patent No.: US 9,064,643 B2
(45) Date of Patent: Jun. 23, 2015

(54) MOBILE TERMINAL

(71) Applicant: LG Electronics Inc., Seoul (KR)

(72) Inventors: Sanggil Park, Seoul (KR); Seongwoo Choi, Seoul (KR); Kyoungjoon Park, Seoul (KR); Hyungoo Joo, Seoul (KR); Taehyun Kim, Seoul (KR); Kyuho Lee, Seoul (KR); Jongwon Seo, Seoul (KR); Jongseok Park, Seoul (KR); Hyunghoon Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 13 days.

(21) Appl. No.: 13/842,250

(22) Filed: Mar. 15, 2013

(65) Prior Publication Data

US 2014/0097071 A1    Apr. 10, 2014

(30) Foreign Application Priority Data

Oct. 10, 2012 (KR) .................. 10-2012-0112259
Nov. 5, 2012 (KR) .................. 10-2012-0124067

(51) Int. Cl.
| | | |
|---|---|---|
| H01H 9/12 | (2006.01) | |
| H01H 9/18 | (2006.01) | |
| H04M 1/22 | (2006.01) | |
| H04M 1/23 | (2006.01) | |
| H04M 1/02 | (2006.01) | |

(52) U.S. Cl.
CPC ............. *H01H 9/182* (2013.01); *H04M 1/0202* (2013.01); *H04M 1/22* (2013.01); *H04M 1/23* (2013.01); *H01H 2219/036* (2013.01)

(58) Field of Classification Search
CPC ..... H01L 27/12; H04N 9/3102; H04N 9/3197
USPC ................... 362/23.01, 85, 24, 394; 439/138
See application file for complete search history.

(56) References Cited

U.S. PATENT DOCUMENTS

2007/0285913 A1    12/2007  Cybart et al.
2008/0187716 A1*   8/2008   Yu et al. ................ 428/138

FOREIGN PATENT DOCUMENTS

WO    WO 2010/071600 A1    6/2010

* cited by examiner

*Primary Examiner* — Tracie Y Green
(74) *Attorney, Agent, or Firm* — Birch, Stewart, Kolasch & Birch, LLP (57) ABSTRACT

A mobile terminal is provided. The mobile terminal has a case, a top button located in a surface of the case, the top button including a light blocking part and a light transmitting part formed at a circumferential portion of the light blocking part, the top button having a front side exposed through the surface of the case and back side opposite the front side, a metal dome arranged at the back side of the top button, the metal dome having a projected center, an actuator configured to press the projected center of the metal dome to deform the metal dome when the top button is pressed, a circuit board having the metal dome seated on a side thereof, a light source mounted at the circuit board and a light guide layer configured to direct the light of the light source toward the surface of the case.

11 Claims, 7 Drawing Sheets

MOBILE TERMINAL

Pursuant to 35 U.S.C. §119(a), this application claims the benefit of earlier filing date and right of priority to Korean Application No. 10-2012-0112259 and No. 10-2012-0124067, filed on Oct. 10, 2012 and Nov. 5, 2012, the contents of which are hereby incorporated by reference herein in their entirety.

BACKGROUND OF THE DISCLOSURE

1. Field of the Disclosure

The present invention relates to a mobile terminal having a structure configured to make light emitted from a user input unit arranged in a front side thereof.

2. Discussion of the Related Art

Generally, terminals can be classified into mobile terminals and stationary terminals. In addition, the mobile terminals can be further classified into handheld terminals and vehicle mount terminals.

Further, a mobile terminal is a device which may be configured to perform various functions such as data and voice communications, capturing images and video via a camera, recording audio, playing music files and outputting music via a speaker system, and displaying images and video on a display.

As a touchscreen is applied to such a mobile terminal, a keypad or various buttons tend to be omitted. Here, to prepare for a problem of touch input error or for user convenience, there may be provided in the mobile terminal a user input unit applied a physical pressure by a user to input a signal.

SUMMARY OF THE DISCLOSURE

Accordingly, the present invention is directed to a mobile terminal that substantially obviates one or more problems due to limitations and disadvantages of the related art.

An object of the present invention is to provide a mobile having a structure configured to make light emitted from a user input unit arranged in a front side thereof.

To achieve these objects and other advantages and in accordance with the purpose of the invention, as embodied and broadly described herein, a mobile terminal includes a case in which electronic components are mounted; a top button inserted in a front side of the case, the top button comprising a light blocking part to block light and a light transmitting part formed in a circumferential portion of the light blocking part to transmit light therethrough; a metal dome arranged in a back side of the top button, the metal dome having a hemispheric shape with a projected center; an actuator configured to press the projected surface of the metal dome to deform the metal dome, when the top button is pressed; a circuit board having the metal dome seated on a side thereof, the circuit board configured to generate a signal as the metal dome is deformed; a light source mounted in the circuit board to emit light; and a light guide layer configured to emit the light of the light source toward a front side of the case.

The light source may be arranged in a lateral side of the light guide layer to emit the light toward the lateral side of the light guide layer, or arranged in a back side of the light guide layer to emit the light toward the front side of the mobile terminal.

Two light sources may be arranged in a longitudinal direction of the top button.

The light guide layer may be a light guide film or a transparent plastic, with a diffusion pattern.

The light guide layer may be coupled to a back side of a button unit.

The actuator may be coupled to a top side of the metal dome to be positioned between the light guide layer and the metal dome.

The top button may further include a button base coupled to a back side thereof to fix the top button to the case, and the actuator is projected from a back side of the button base.

The top button may be formed of a transparent plastic material, and the light blocking part may be formed by disposing a printed layer on a back side of the top button formed of the transparent plastic material.

The printed layer may include a color layer to show a color and a black layer to block light.

The light transmitting layer may be a metallic color layer formed in a non-conductivity deposition method to transmit light therethrough.

The top button may further include a button base coupled to a back side thereof to fix the top button to the case, and the actuator may be projected from a back side of the button base.

The mobile terminal may further include a frame comprising a seating part having the circuit board coupled thereto and a lateral wall formed in a circumferential portion of the seating part to support the top button.

At least predetermined portion of the circuit board is formed of a flexible substrate, and the circuit board further comprises a connection terminal formed in the flexible substrate, with being connected to a main substrate of the mobile terminal.

The circuit board has the other side coupled to a connector that is able to be connected to an external device.

The circuit board may include a first substrate arranged in a back side of the top button, the first substrate having the light guide layer, the metal dome and the light source coupled thereto; a second substrate arranged in a back side of the first substrate; a ductile circuit board including ductile portions formed in an end of the first substrate and an end of the second substrate; and a mold arranged between the first substrate and the second substrate, and the circuit board may further include a connector fixed to the mold via the second substrate to be connected to an external device.

The metal dome may be coupled to a back side of the first substrate, and the actuator may be arranged between the metal dome and the mold.

The present invention has following effects. According to at least one of the embodiments, there may be provided a mobile terminal having a structure configured to make light emitted from a user input unit arranged in a front side thereof.

According to the color of the home button, various states of the mobile terminal are shown and an auxiliary indicator can be omitted.

Furthermore, the connector and the home button are mounted on one circuit board. Accordingly, the space may be saved.

Still further, the positions of the actuator, the light guide layer and the light source provided in the home button are changed. Accordingly, freedom in arrangement of the other elements in the mobile terminal can be improved.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DESCRIPTION OF SPECIFIC EMBODIMENTS

In the following detailed description, reference is made to the accompanying drawing figures which form a part hereof, and which show by way of illustration specific embodiments of the invention.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
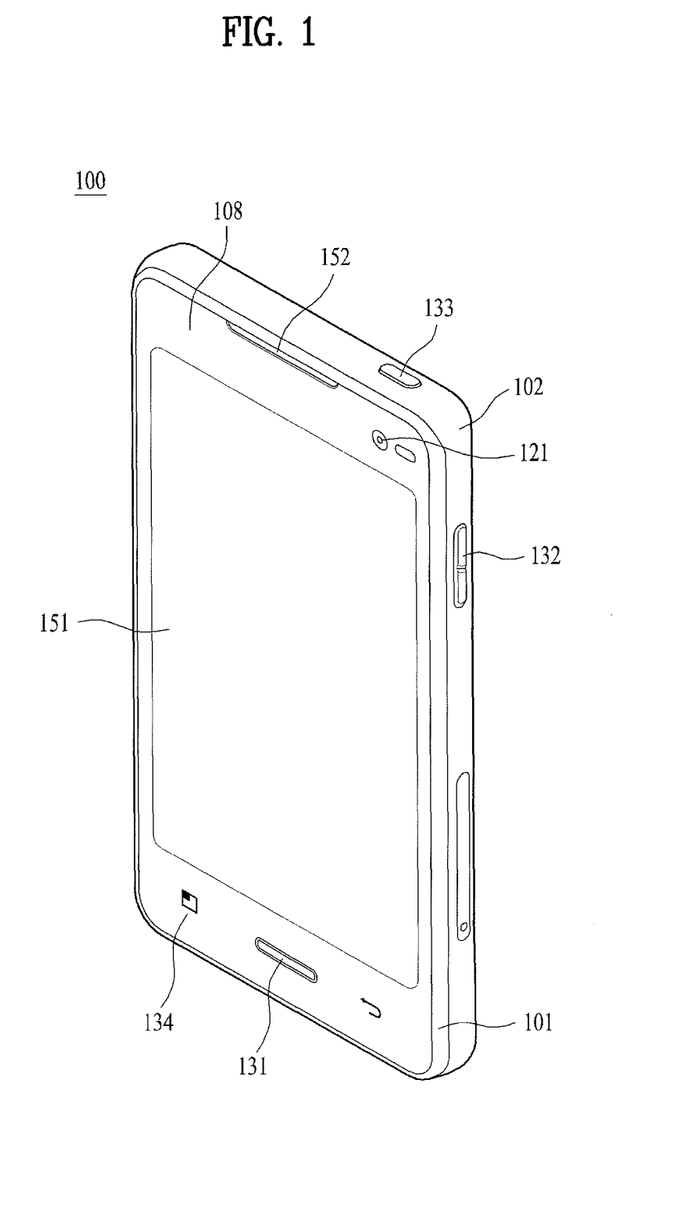
FIG. 1 is a perspective diagram of a front side provided in a mobile terminal according to a first embodiment of the present invention.

FIG. 1 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Figure 2:
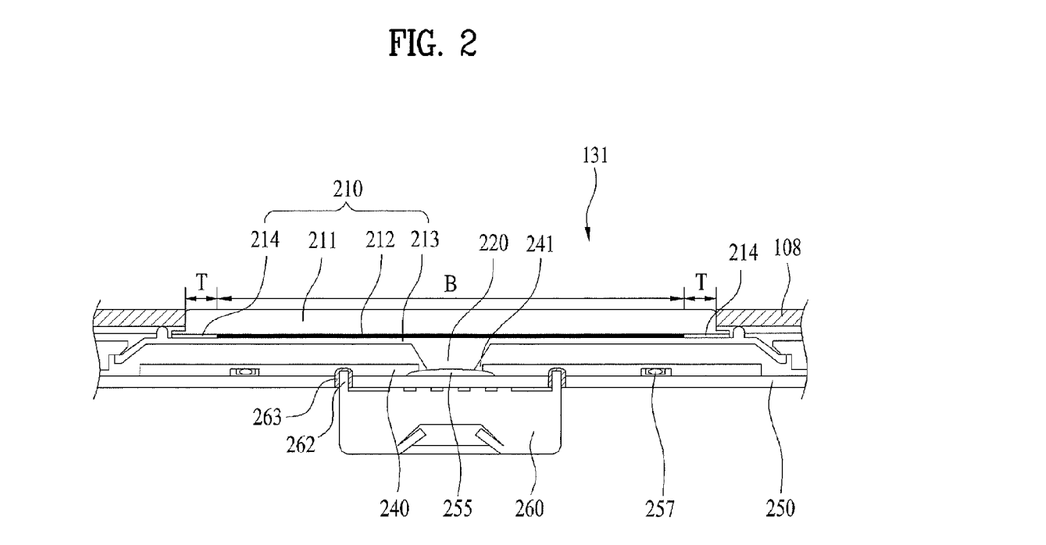
FIG. 2 is a sectional diagram illustrating a home button provided in the mobile terminal according to the first embodiment of the present invention.

Referring to FIG. 2, the mobile terminal 100 includes a case 101, 102, configuring an exterior thereof. In the present embodiment, the case can be divided into a front case 101 and a rear case 102. Various electric/electronic parts are loaded in a space provided between the front and rear cases 101 and 102.

The front case 101 covers a front side of the mobile terminal. The display 151, the home button 131, the camera 121, the audio output unit 152 and the proxy sensor 141 may be arranged in the front side of the mobile terminal. An opening is formed in a predetermined portion of the front case 101, corresponding to the positions of the display 151, the camera 121 and the proxy sensor 141, where light has to transmit. A window glass 108 formed of a transparent material is arranged in the opening to cover it.

The window glass 108 can have a relatively large size enough to cover all of plural openings. Or, an auxiliary transparent window glass 108 independent from the opening may be used. According to the present invention, an integral type window glass 108 may be used in order to provide a uniform front design to the front side of the mobile terminal.

Occasionally, electronic components can be mounted on a surface of the rear case 102. The electronic part mounted on the surface of the rear case 102 may include such a detachable part such as a battery, a USIM card, a memory card and the like. In doing so, the rear case 102 may further include a backside cover configured to cover the surface of the rear case 102. In particular, the backside cover has a detachable configuration for the user's convenience. If the backside cover is detached from the rear case 102, the surface of the rear case 102 is exposed.

The cases 101 and 102 can be formed by injection molding of synthetic resin or can be formed of metal substance such as stainless steel (STS), titanium (Ti) or the like for example.

A display 151, an audio output unit 152, a camera 121, user input units 131 and 132, a microphone 134, an interface and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 134 are provided to another area adjacent to the other end portion of the display 151. The user input unit 132 and the interface can be provided to lateral sides of the front and rear cases 101 and 102.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittable type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor configures a mutual layer structure (hereinafter called 'touch screen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller. Therefore, the controller is able to know whether a prescribed portion of the display 151 is touched.

As mentioned above, the display 151 occupies most areas of the front side and then users are sensitive to the size or quality of the display. Accordingly, there are demands of reducing the size of bezel covering wiring near the display 151 or the electronic components arranged in the mobile terminal 10 such as a camera imaging device 121 or a receiver of an audio module 152.

It is not simple to reduce the bezel because of the wiring or the coupling force among the elements. As the size of the bezel is getting reduced, there might be a light leakage phenomenon generated by light abnormally emitted from a lateral side of the display 151.

To prevent those disadvantages, the structure of the display 151 according to the present invention may be changed and it will be described in detail later, referring to FIGS. 2 to 11.

The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory or can be externally transmitted via the wireless communication unit 110. Optionally, at least two cameras 121 can be provided to the mobile terminal 100 according to environment of usage.

The microphone 134 receives an external audio signal while the portable device is in a particular mode, such as phone call mode, recording mode and voice recognition. This audio signal is processed and convened into electric audio data. The processed audio data is transformed into a format transmittable to a mobile communication base station via the mobile communication module 112 in case of a call mode. The microphone 134 typically includes assorted noise removing algorithms to remove noise generated in the course of receiving the external audio signal.

The input unit is manipulated to receive a command for controlling an operation of the terminal 100. And, the input unit is able to include a plurality of user input units 131 and 132. The user input units 131 and 132 can be named a user input portion and may adopt any mechanism of a tactile manner that enables a user to perform a manipulation action by experiencing a tactile feeling.

Content input by the first or second user input unit 131 or 132 can be diversely set. For instance, such a command as start, end, scroll and the like is input to the first user input unit 131. In addition, a command for a volume adjustment of sound output from the audio output unit 152 and the like can be input to the second user input unit 132, a command for a switching to a touch recognizing mode of the display 151 and the like can be input to a manipulating unit 133.

FIGS. 2 to 11 are sectional diagrams illustrating a home button 131 of a mobile terminal according to various embodiments of the present invention. FIG. 2 shows a window glass 108, a top button 210, a metal dome 255, an actuator 220, a circuit board 250, a light source 257, a light guide layer 240 and a connector 260.

The window glass 108 occupies a predetermined portion of the case and it is coupled to a front side of the front case 101 to enable light to pass through an opening formed in the front case 101. An opening has to be formed in a portion where the audio output unit 152 is arranged to transmit sound.

Moreover, an opening is formed in the window glass 108 to insert the home button 131 therein. The home button 131 consists of the button type user input unit provided with a pressure by the user to generate a signal, not using a touch sensor.

The home button 131 configured to generate a signal as it is pushed may include a top button 210, an actuator 220, a light guide layer 240, a light source 257, a metal dome 255 and a circuit board 250.

The top button 210 is positioned beyond the metal dome 255 and it covers the metal dome 255 not to expose the metal dome 255 outside. Here, the top button 210 is a part directly pressured by the user and it is inserted in the opening formed in the window glass 108. The top button 210 is arranged in parallel with a surface of the window glass 108 and it is formed of a transparent plastic material, like the window glass 108.

The home button 131 according to the present invention includes a light transmitting part (T) arranged in an edge portion thereof to emit light and a light blocking part (B) arranged in a central portion to block light. The light blocking part (B) may be printed on a back side of a transparent plastic button 211. First of all, an exterior color ink is printed and a dark color ink is printed lastly, only to form the light blocking part (B).

The light transmitting part (T) is positioned around the light blocking part (B) and a dark color ink is not printed on the light transmitting part (T), only to transmit light therethrough. Optionally, Non-conductive Vacuum Metallization (NCVM) is used for coating 214 of the light transmitting part (T) (Mirror-printing). In this instance, there might be a disadvantage of deteriorated transmissivity but a gentle soft light is emitted to help to improve the esthetic sense of the button unit.

A lower end of the top button 210 may be stepped not to separate from the opening formed in the window glass 108 and a button base 213 may be further provided in the lower end of the top button 210. Such a button base 213 is formed of an elastic material such as rubber or silicon and the button base 213 may be transparent or thin-colored enough to transmit light therethrough, such that light can be provided to the light transmitting part (T). In case of layering a white-colored film or using white-colored silicon, light can be diffused uniformly and the button base 213 may be employed as a diffusive sheet.

The button base 213 is extended in both opposite directions, to be fixed to the case or frame of the mobile terminal 100. When the top button 210 is pushed even in case both ends of the button base 213 are fixed formed of the elastic material, a position of a central portion possessed by the button base can be changed.

Considering the thickness of the mobile terminal 100, the metal dome 255 is formed of a thin material. The metal dome 255 is a dome-shaped thin material having a convex center and it has a restitution force. Once it is pressed, the convex portion of the metal dome 255 is pushed and once the pressure is removed, the pushed convex portion returns to its original shape. The metal dome 255 can be formed of a metallic material such as aluminum to generate an electric signal when it is pressured, with such a restitution force.

Figure 7:
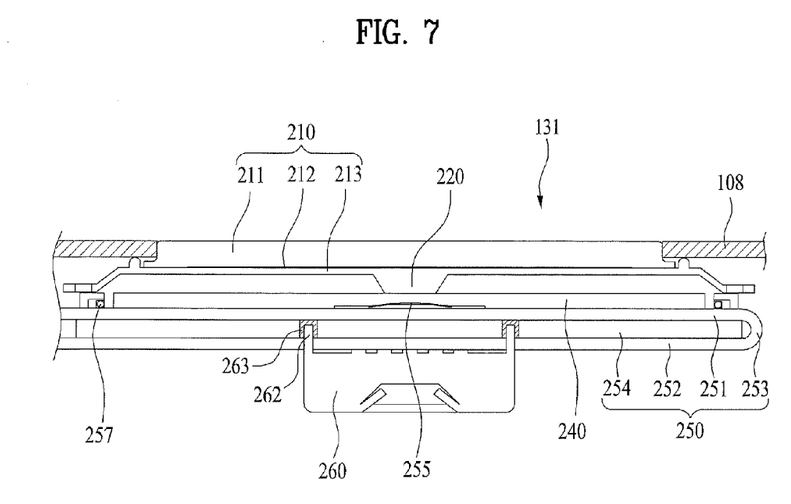
FIG. 7 is a sectional view illustrating a home button provided in a mobile terminal according to a sixth embodiment of the present invention.
Figure 8:
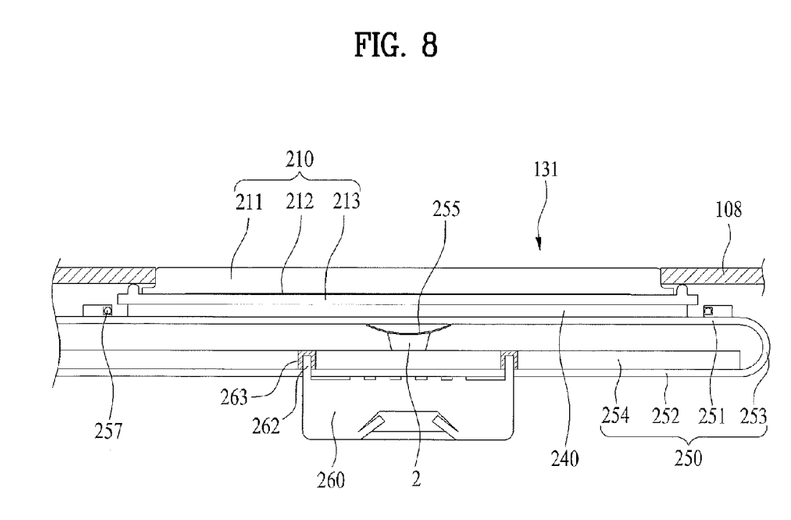
FIG. 8 is a sectional view illustrating a home button provided in a mobile terminal according to a seventh embodiment of the present invention.

The metal dome 255 is seated on the circuit board 250 and the shape of the metal dome 255 is deformed when the top button 210 is pushed. At this time, the metal dome 255 is in contact with the terminal formed on the circuit board 250, to generate an electric signal. As shown in FIGS. 2 to 7, the metal dome 255 is arranged to position the convex portion toward the top button 210. As shown in FIG. 8, the metal dome 255 may be attached to an opposite side of the circuit board 250 to position the convex portion toward the reverse side.

In case the metal dome 255 is attached to the opposite side of the circuit board 250 as shown in FIG. 8, the top button 210 is pushed and then the circuit board 250 is deformed corresponding to the motion of the top button 210. Accordingly, the circuit board 250 may be formed of a flexible material.

The actuator 220 is arranged on a top surface of the metal dome 255. When the top button 210 is pushed, the convex portion of the metal dome 255 presses the actuator 220 to generate the signal. The actuator 220 has a predetermined size corresponding to the convex portion of the metal dome 255 and it may be formed of an elastic material to contact with the metal dome 255 gently even with the deformation of the metal dome 255. For example, such an elastic material may include rubber and silicon.

Figure 3:
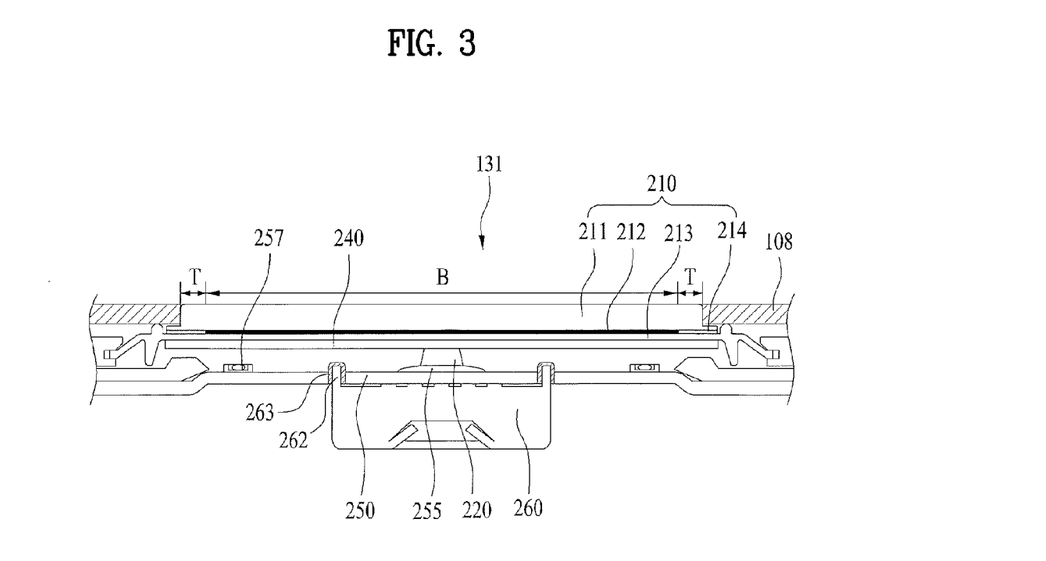
FIG. 3 is a sectional view illustrating a home button provided in a mobile terminal according to a second embodiment of the present invention.

As shown in FIGS. 4, 5, 6 and 8, the actuator 220 may be attached on the metal dome 255. Optionally, as shown in FIGS. 2, 3 and 7, the actuator 220 may be formed in a back side of the material facing the metal dome 255 (in the drawings, a back side of the top button 210, namely, the button base 213).

As mentioned above, the circuit board 250 may be configured to generate the electric signal when the metal dome 255 disposed on the circuit board 250 is deformed. In embodiments shown in FIGS. 2, 3 and 4, the circuit board 250 may be a solid circuit board. Alternatively, in embodiments shown in FIGS. 5 to 8, the circuit board may be a flexible substrate if it has to be bent or deformed. An overall area of the circuit board 250 may be formed of a flexible material or a predetermined portion thereof may be formed of such a flexible material.

The light source 257 is mounted on the circuit board 250 and it emits light when an electric voltage is applied thereto. For example, a light emitting diode (LED) capable of emitting brighter light even with a relatively small size may be used as the light source 257. At this time, the light source 257 may include a plurality of lamps and lights having various colors may be combined and emitted. Accordingly, the light source 257 may be controlled to emit a different light based on a state of the mobile terminal 100 and it is used as an indicator.

One light source 257 may be provided or light sources 257 are longitudinally provided in both sides of the top button 210 as shown in the drawings, to emit lights uniformly. Moreover, the light source 257 may emit light in a lateral side of the light guide layer 240 as shown in FIG. 2 or in a back side of the light guide layer 240 as shown in FIGS. 3 and 4.

Figure 4:
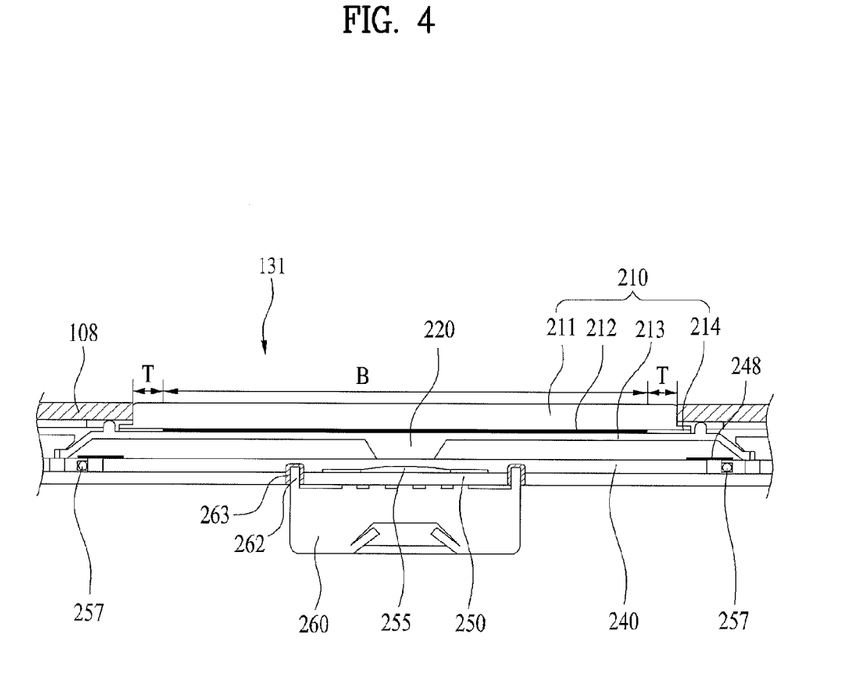
FIG. 4 is a sectional view illustrating a home button provided in a mobile terminal according to a third embodiment of the present invention.

In case the light source emits light in the lateral side of the light guide layer as shown in FIG. 4, the light happens to leakage via a space formed between the light guide layer 240 and the light source 257. Because of that, a light blocking tape 248 may be attached to prevent the light leakage.

The light guide layer 240 is employed to scatter the lights to convert the point light source of light into the surface light source. Typically, a light guide film having a diffusion pattern formed on a transparent film to scatter lights may be used as the light guide layer 240.

The diffusion pattern may be formed different according to its position from the light source 257. In other words, as the light guide layer 240 is getting farther from the light source 257, the intensity of light is getting weaker and the diffusion pattern has to be formed more dense and complex to scatter a less amount of lights.

In case of forming the actuator 220 integrally formed on a back side of the top button 210 integrally formed with the button base 213, it is difficult to layer the light guide layer 240. Accordingly, the light guide layer 240 may be disposed on the top side of the circuit board 250, covering the metal dome 255, as shown in FIG. 2 or 3.

In this case, the actuator 220 may be arranged between the bottom side of the top button 210 and the light guide layer 240. The actuator 220 need not be molded separately and it can be fixed to the top button 210 stably. It is only difficult to dispose the light guide layer 240 evenly because the light guide layer 240 is disposed on an uneven surface of the metal dome 255. Accordingly, a bent light guide layer 240 may be provided as shown in FIG. 2 or 3.

As shown in FIG. 2, an open hole 241 may be formed in the light guide layer 240 to make the actuator 220 directly contact with the top side of the metal dome 255 therethrough. Also, a guide hole may be formed in the actuator 220 to guide the position of the light guide layer 240 when the light guide layer 240 is disposed.

Optionally, as shown in FIG. 4, the actuator 220 may be attached to the top side of the metal dome 255 and a back side of the button base 213 is formed evenly to dispose the light guide layer 240 thereon.

Figure 5:
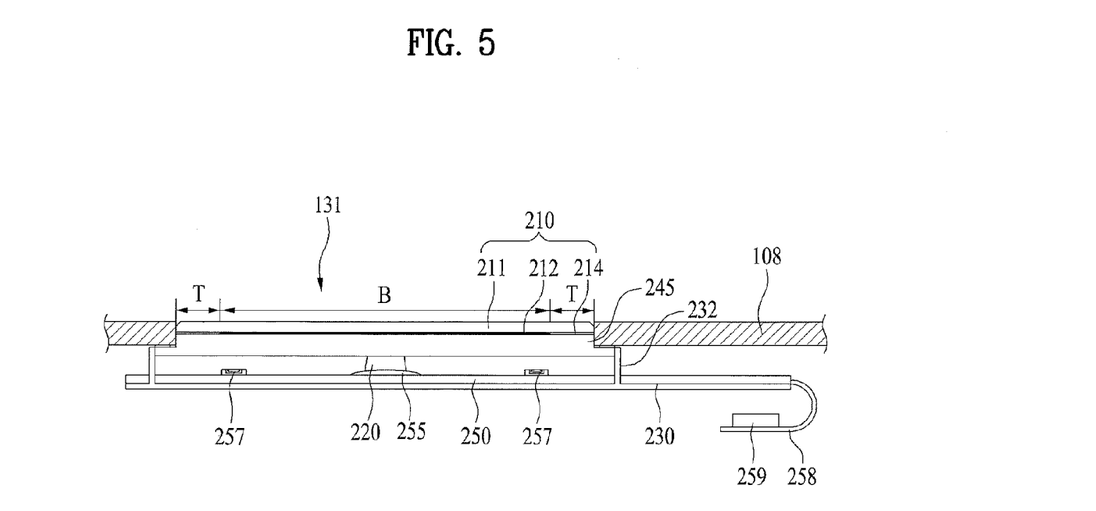
FIG. 5 is a sectional view illustrating a home button provided in a mobile terminal according to a fourth embodiment of the present invention.
Figure 6:
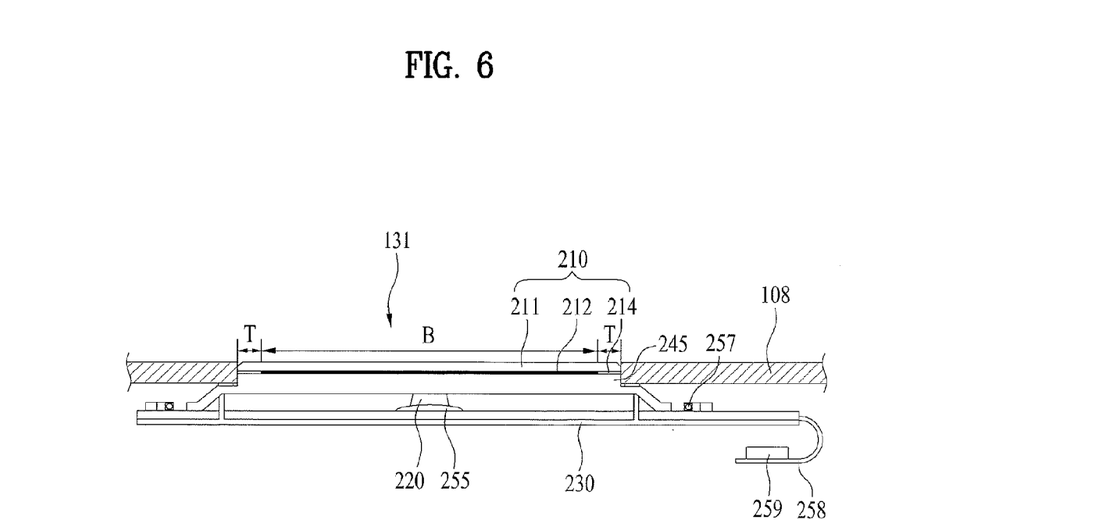
FIG. 6 is a sectional view illustrating a home button provided in a mobile terminal according to a fifth embodiment of the present invention.

Optionally, as shown in FIGS. 5 and 6, a transparent plastic material 245 having a diffusion pattern may be used as the light guide layer 240. Compared with the optical diffusion film, the light guide layer 240 formed of the transparent plastic having the diffusion pattern is relatively thicker and stronger and it may be partially employed as the button unit. The light guide layer 240 may be coupled to a back side of the plastic button 211, with no auxiliary button. base 213. Plastic can be elastically deformable in a predetermined range. Even in case both ends of the light guide layer 240 formed of the plastic are fixed, the position of the actuator 220 is moved downward to press the metal dome 255 when the top button 10 is pressed.

Even in this instance, the light guide layer 240 is positioned in the back side of the top button 210 and it is difficult to directly couple the actuator 220 to the top button 210. Accordingly, the actuator 220 may be attached to the top side of the metal dome 255.

As shown in FIGS. 5 and 6, the frame 230 may be further provided and it includes a seating part to seat the circuit board 250 thereon and a lateral wall 232 formed around the seating part to support the top button 210. The frame can make the home button 131 having the top button 210 and the circuit board 250 spaced apart as far as the height of the lateral wall.

The home button 131 arranged in the front side mentioned above may be positioned in a lower end of the display 151 and an interface may be arranged in a lower end of the mobile terminal 100. The interface may be connected with an external media to provide the power to the mobile terminal 100 or to be a passage for exchanging data and it may include a connector 260 to insert a cable terminal therein.

The connector 260 may be positioned behind the home button 131 and it may be coupled to the other side of the circuit board having one side on which the metal dome 255 is seated. As shown in FIGS. 2 to 4, a through hole if formed in the circuit board 250 to couple the connector 260 therethrough and a protrusion 262 formed in the connector 260 is inserted in the through hole, to be fixed by soldering (263).

At this time, the soldered portion 263 is projected to one side of the circuit board 250 such that the contacting surface of the light guide layer 240 may not be even enough to dispose the light guide layer 240. Also, in case of using the flexible material in forming the circuit board 250, the force supporting the connector might be insufficient and it might be difficult to fix the connector 260.

As shown in FIGS. 7 and 8, the circuit board 250 may include flexible substrates 251, 252 and 253 and it may use a mold 254 to reinforce the insufficient rigidity. The circuit board 250 may consist of the flexible substrates 251, 252 and 253 and the solid mold 254 disposed between each two of the flexible substrates 251, 252 and 253.

The flexible substrate includes a first substrate 251 arranged in a back side of the top button 210, having the metal dome 255 and the light source 257 coupled thereto, a second substrate 252 arranged behind the first substrate 251, spaced apart a predetermined distance from the first substrate 251, and an ductile portion 253 for connecting the first substrate 251 and the second substrate 252 with each other.

The second substrate 252 may be electrically connected with the connector 260 and the connector 260 may be fixed to the mold 254, passing through the second substrate 252. The thickness of the mold 254 makes the soldered portion 263 not projected to the first substrate 251.

Referring to FIGS. 2 to 8, the arrangement of each element according to embodiments of the present invention will be described as follows. Repeated description will be omitted.

FIG. 2 shows the first embodiment of the present invention. The top button 210 may consist of the transparent plastic button 211, the printed layer 212 configured to form the light transmitting part (B) in the back side of the transparent plastic button 211, and the button base 213 arranged in the back side of the plastic button 211. The actuator 220 is formed in the back side of the button base 213 and the metal dome 255 arranged toward the top button 210 is seated on the circuit board 250.

The light source 257 arranged toward the front side of the top button 210 is disposed in longitudinal sides of the top button 210 to emit light toward the front surface. The film type light guide layer 240 is disposed to cover the light source 257 and the metal dome 255. The connector 260 may be coupled to the back side of the circuit board 250.

FIG. 3 shows a second embodiment of the present invention. Similar to the first embodiment, the light guide layer 240 is disposed on the back side of the top button, instead of the actuator 220, in the second embodiment. The actuator is coupled to a top side of the metal dome 250.

FIG. 4 shows a third embodiment of the present invention. Similar to the first embodiment, in the third embodiment the light source 257 is positioned in a lateral side of the light guide layer 240 to emit the light in a side direction of the light guide layer 240. When the light is incident on the lateral side, compared with on the back side of the light guide layer 240, the light may be scattered toward the front surface more efficiently.

FIG. 5 shows a fourth embodiment of the present invention. In the fourth embodiment, the top button 210 includes no button base 213 and the light guide layer 240 formed of a plastic material is coupled to the back side of the plastic button 211. In other words, the light guide layer 240 may scatter lights toward the front side uniformly and also it may be employed as the button base 213 configured to fix the top button 210 to the mobile terminal 100. A protrusion is formed to fix the top button 210 to the lateral side of the light guide layer 240. A frame may be further provided to fix the top button 210.

The frame mentioned above includes a seating part where the circuit board 250 is seated and a lateral wall projected from a circumference of the seating part. The top button 210 is fixed to the lateral wall. The top button 210 and the circuit board 250 are spaced apart from each other as far as the distance corresponding to the height of the lateral wall, and they are modulated by the frame.

The frame may further include a connection terminal to be connected with a main substrate. The position of the main substrate is different from the position of the circuit board 250 and a predetermined portion or overall portion of the frame may be formed of a flexible substrate.

FIG. 6 shows a fifth embodiment of the present invention. This embodiment is similar to the fourth embodiment mentioned above, except the light source 257 arranged in a lateral side of the light guide layer 240, not a back side of the light guide layer 240. The light guide layer 240 is spaced apart from the circuit board 250 and both ends of the light guide layer 240 may be extended to the light source 257.

FIGS. 7 and 8 show sixth and seventh embodiments of the present invention. The sixth and seventh embodiments may include a circuit board 250 having the mold 254 mentioned above. The mold 254 is configured to provide the rigidity to the flexible substrate and to fix the connector 260. There may be provided a flexible substrate including a first substrate 251 arranged in a front side of the mold 254, a second substrate 252 arranged in a back side of the mold 254 and a ductile portion 253 for connecting the first substrate 251 and the second substrate 252 with each other.

At this time, the light guide layer 240 is disposed on a top side of the circuit board 250. As shown in the drawings, light may be emitted from a lateral side of the light guide layer 240 or light may be incident on a back side of the light guide layer 240 like the first embodiment.

In the seventh embodiment of FIG. 8, the light guide layer 240 is attached to the back side of the top button 210. At this time, the lateral side of the light guide layer 240 has to be extended to compensate the height corresponding to the heights of the metal dome 255 and the actuator the light source 257 to emit the light from a lateral side of the light guide layer 240, as shown in FIG. 6.

It is difficult to fix the film type light guide layer 240 spaced apart in a lateral direction, different from the light guide layer 240 formed of plastic shown in FIG. 6. Accordingly, the position of the circuit board 250 may be changed as shown in FIG. 8. In other words, the first substrate 251 is arranged to closely contact with the light guide layer 240 and the metal dome 255 and the actuator 2 are positioned in the back side of the first substrate 251, such that the light source 257 mounted on the circuit board 250 may be emit light toward a lateral direction of the light guide layer 240. At this time, the metal dome 255 is coupled to the back side of the first substrate 251 and the actuator 220 is arranged between the metal dome 255 and the mold 254.

Figure 9:
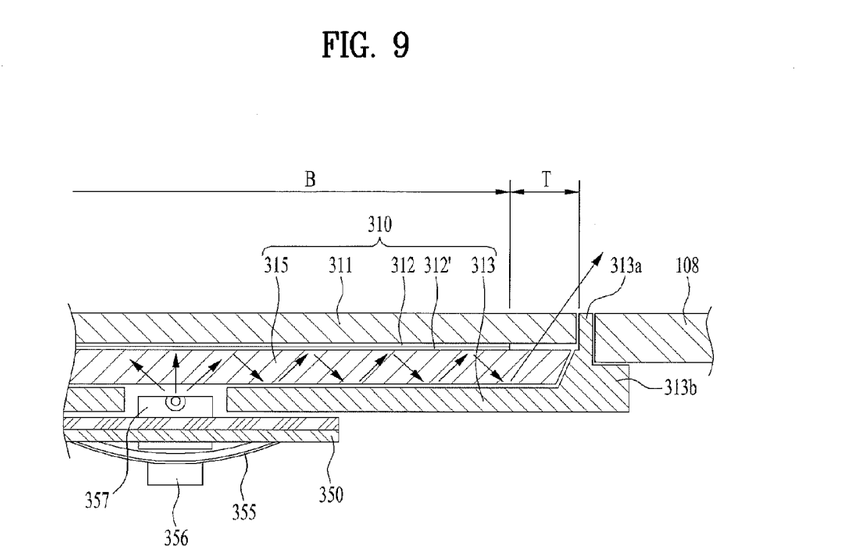
FIG. 9 is a sectional view illustrating a home button provided in a mobile terminal according to an eighth embodiment of the present invention.

FIG. 9 is a sectional diagram illustrating a home button 131 of a mobile terminal according to an eighth embodiment of the present invention. FIG. 9 shows a top button 310, a circuit board 350, a light source 357, a metal dome 355 and an actuator 356.

The top button 310 is exposed to a front side of the case composing the mobile terminal and it is inserted in a button hole formed in the window glass 108 disposed in a front side of the mobile terminal. When light is transmitted from a back side of the top button 310, the light is not emitted to the front side of the case from a light blocking part (B) formed in a center of the top button 310 and emitted to the front side from the light transmitting part (T).

The top button 310 has a three-layered structure configured of an upper button 311 reflecting the light irradiated to the light blocking part (B) toward the back side of the top button 310, a light guide layer 315 dispersing the lights emitted from the light source uniformly, and a lower button 313 coupled to a back side of the light guide layer 315, with a center portion where the light source 357 is inserted.

In the embodiment shown in FIG. 9, the upper button 311 is formed of a transparent material such as transparent acryl and it is preferred that the upper button 311 is formed of a predetermined material similar to the material used for the window glass 108 formed in the front side of the case. At this time, a reflection layer 312' may be formed in a predetermined portion corresponding to the light blocking part (B) to reflect the light emitted to the light blocking part (B) toward the back side of the upper button 311, namely, the light guide layer 315.

The reflection layer 312' may be formed in a front or back side or both sides of the upper button 311. In case of forming the reflection layer 312' in the front side, the reflection layer 312' might be worn by repeated usage. In an aspect of durability, the reflection layer 312' may be formed in the back side of the upper button 311.

At this time, a printed layer 312 may be further provided to realize a color of the front side of the top button and to block the light of the light source 357, before forming the reflection layer 312'. The printed layer 312 may be printed the same color as the window bezel 108 to provide uniformity to the exterior design. When the color of the printed layer 312 is bright, a dark color ink can be additionally printed on the printed layer 312 to block the light.

The lower button 313 may form a lower portion of the top button 310 and an opening is formed in a center of the lower button 313 to insert the light source 357 therein. The light source 357 is inserted in the opening to provide the light to the light guide layer 315 directly.

The lower button 313 may be formed of a metallic material such as aluminum and it may form the lower portion of the top button 310. At this time, the lower button 313 may further include a lateral wall 313a extended forward to cover the upper button 311 and a lateral side of the light guide layer 315. Seen in front, an upper end of the lateral wall 313a may be exposed to a front circumference of the top button 310.

Moreover, the lower button 313 may further include a stepped portion 313b extended outward with respect to the button hole formed in the window glass 108 to be hooked to the button hole. The stepped portion 313b may couple the top button 310 to the case to prevent the top button from separating from the mobile terminal.

The light guide layer 315 coupled to the back side of the upper button 311 is configured to diffuse light and it may be formed of a transparent material or a white material capable of scattering light. The light guide layer 315 may be formed of a transparent acrylic material or an optical guide film having a micro light diffusion pattern.

The light source 357 inserted in the center opening of the lower button 313 provides light to the center of the light guide layer 315. The light incident on the light guide layer 315 may be reflected between the reflection layer 312' of the upper button 311 and the lower button 313 formed of the metallic material, to travel to the circumferential portion of the light guide layer 315. The reflection layer 312' is formed only in the light blocking part (B). When the light reaches the portion of the upper button 311 corresponding to the light transmitting part (T), the light is emitted toward the front side.

The circuit board 350 having the front side to mount the light source 357 thereto and the back side to mount the metal dome 355 thereto may be coupled to the back side of the top button 310. In other words, the light source 357 is inserted in the central opening of the lower button 313 to cover the opening and it is coupled to the back side of the lower button 313. The circuit board 350 provides the power to the light source 357 and transmits a signal for controlling ON/OFF of the light source 357 from the controller.

The metal dome 355 arranged in the back side of the circuit board 350 is a dome-shaped member formed of a metallic material, with a projected center. When the top button 310 is pressed, the shape of the metal dome is changed to generate an electric signal and the signal is transmitted to the controller via the circuit board 350.

The force has to be concentrated on the projected center portion of the metal dome 355 such that the signal may be generated by even a small force. The actuator 356 may be attached to the projected surface of the metal dome 355. When the top button 310 is pushed, only the central portion of the metal dome 355 is pressed by the actuator 356 and the signal is generated.

Figure 10:
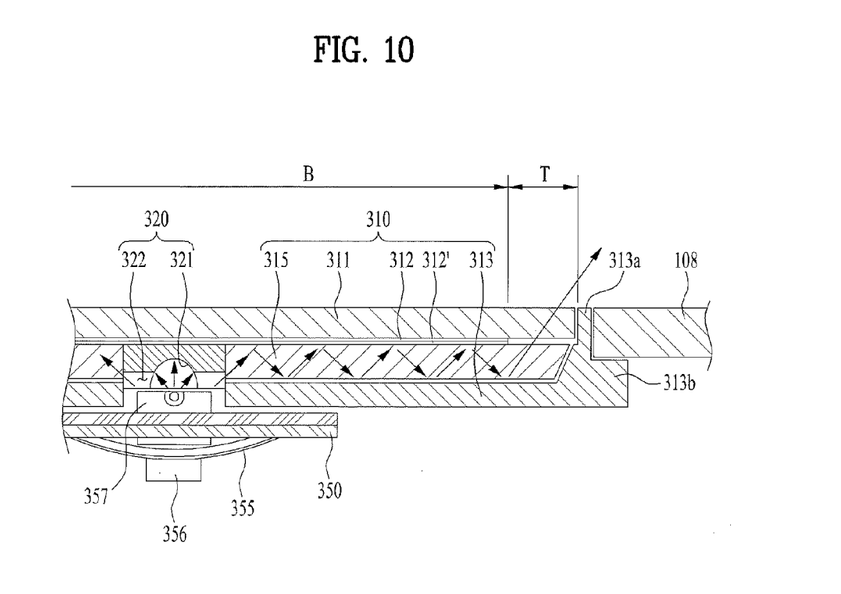
FIG. 10 is a sectional view illustrating a home button provided in a mobile terminal according to a ninth embodiment of the present invention.

FIG. 10 is a sectional view illustrating another embodiment of the home button according to the ninth embodiment of the present invention. This embodiment is similar to the embodiment shown in FIG. 9, except that a reflection dome 320 is inserted in a center of the light guide layer 315.

The reflection dome 320 is include a concave surface 321 to disperse the light emitted from the light source forwardly toward a lateral direction, that is, the light guide layer 315. To make the light reflected by the reflection dome 320 incident on the light guide layer 315, the reflection dome 320 may further include a light channel 322 extended in a lateral direction as shown in FIG. 9.

In case the top button 310 has a long shape along a predetermined direction (in a right and left direction according to the embodiment of FIG. 1), it is preferred that more lights are provided in a right and left direction and accordingly, it is preferred that the light channel 322 is formed in the same direction as the longitudinal direction of the home button 131.

Figure 11:
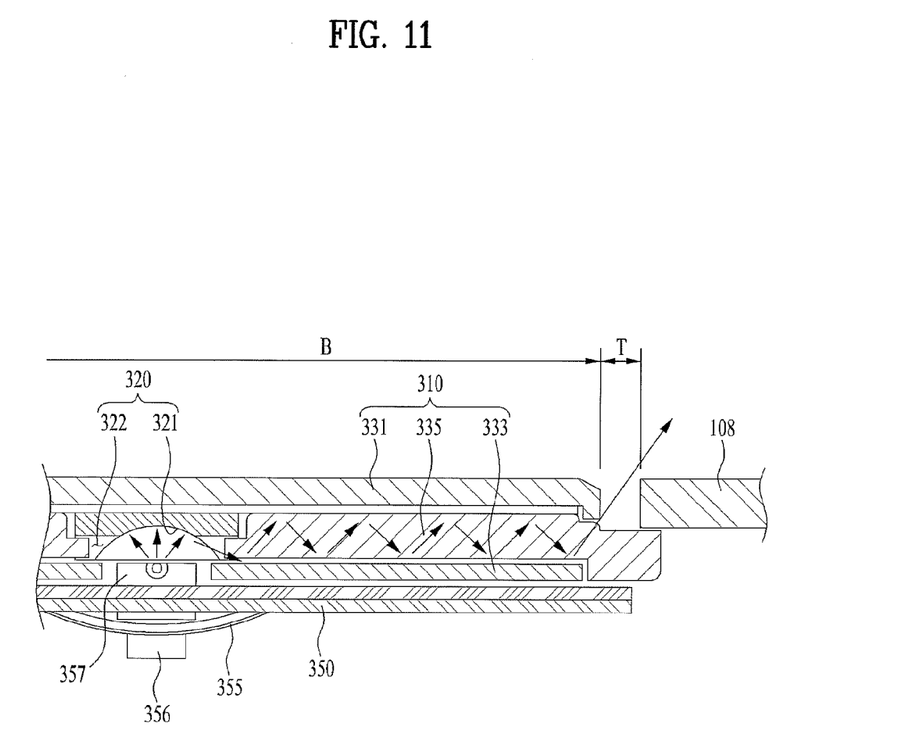
FIG. 11 is a sectional view illustrating a home button provided in a mobile terminal according to a tenth embodiment of the present invention.

FIG. 11 is a sectional diagram illustrating a home button 131 of a mobile terminal according to a tenth embodiment of the present invention. A circuit board 350 coupled to a back side of a top button 330, a light source 357 mounted in both sides of a circuit board 350 and a metal dome 355 are similar to those elements of the embodiment described above. An upper button 331 and a lower button 333 composing a top button 330 according to this embodiment are different from the embodiment mentioned above.

The upper button 331 according to this embodiment is formed of a metallic material. In case the upper button 331 is formed of the metallic material, no auxiliary reflection layer 232 has to be provided and light incident on the upper button 331 is reflected toward the light guide layer 335 again. The upper button 331 forms a light blocking part (B) of the top button 330 and the light is emitted from the light source 357 via a circumferential portion of the upper button 331.

The light guide layer 335 is larger than the metallic upper button 331 and the light of the light source 357 is emitted via a larger circumferential portion of the light guide layer 335. In the drawings, the height of the light guide layer 335 is different from that of the upper button 331. A circumferential portion of the light guide layer 335 may be further extended to make the height of the light guide layer 335 the same as that of the upper button 331.

The lower button 333 may include a reflection layer. The light provided to the central portion of the light guide layer 335 after reflected by the upper and lower buttons 331 and 333 may travel along the circumference of the light guide layer 335. At this time, the lower button 333 may be formed of a metallic material like the lower button described in the above embodiment.

Therefore, according to at least one of the embodiments, the mobile terminal 100 including the home button 131 configured to emit light via a circumferential portion thereof, only to make a front surface of the front surface have a gentrified design.

According to the color of the home button 131, various states of the mobile terminal are shown and an auxiliary indicator can be omitted.

Furthermore, the connector 260 and the home button 131 are mounted on one circuit board 250. Accordingly, the space may be saved.

Still further, the positions of the actuator 220, the light guide layer 240 and the light source 257 provided in the home button 131 are changed. Accordingly, they the home button having those elements can be in harmony with the other elements in the mobile terminal 100.

Various variations and modifications are possible in the component parts and/or arrangements of the subject combination arrangement within the scope of the disclosure, the drawings and the appended claims.

Although embodiments have been described with reference to a number of illustrative embodiments thereof, it should be understood that numerous other modifications and embodiments can be devised by those skilled in the art that will fall within the spirit and scope of the principles of this disclosure.

What is claimed is:

1. A mobile terminal comprising:
a case in which electronic components are mounted;
a top button located in a surface of the case, the top button including a light blocking part to block light and a light transmitting part formed at a circumferential portion of the light blocking part to transmit light therethrough, the top button having a front side exposed through the surface of the case and a back side opposite the front side;
a metal dome arranged at the back side of the top button, the metal dome having a projected center;
an actuator configured to press the projected center of the metal dome to deform the metal dome when the top button is pressed;
a circuit board having the metal dome seated on a side thereof, the circuit board configured to generate a signal as the metal dome is deformed;
a light source mounted at the circuit board to emit light; and
a light guide layer configured to direct the light of the light source toward the surface of the case,
wherein the top button includes:
an upper button configured to reflect the light from the light source to the light blocking part toward a back side of the mobile terminal;
the light guide layer coupled to a back side of the upper button to disperse the light emitted from the light source uniformly; and
a lower button coupled to a back side of the light guide layer, the light source being located in a central portion of the lower button.

2. The mobile terminal according to claim 1, wherein the light source is arranged at a lateral side of the light guide layer to emit the light toward the lateral side of the light guide layer or is arranged at a back side of the light guide layer to emit the light toward the surface of the mobile terminal.

3. The mobile terminal according to claim 1, wherein two light sources are arranged in a longitudinal direction of the top button.

4. The mobile terminal according to claim 1, wherein the light guide layer is selected from one of a light guide film and a transparent plastic having a diffusion pattern.

5. The mobile terminal according to claim 1, wherein the top button is formed of a transparent plastic material, and
wherein the light blocking part is formed by disposing a printed layer on the back side of the top button.

6. The mobile terminal according to claim 5, wherein the light transmitting layer is a metallic color layer formed by a non-conductivity deposition method to transmit light therethrough.

7. The mobile terminal according to claim 1, wherein the upper button includes:
a transparent acrylic sheet;
a reflection layer disposed on a central portion of a back side of the transparent acrylic sheet, the reflection layer defining the light blocking part; and
a printed layer disposed between the reflection layer and the acrylic sheet to block the light of the light source and to define a color of the front side of the top button.

8. The mobile terminal according to claim 1, wherein the lower button includes a lateral wall part configured to cover the upper button and a lateral side of the light guide layer, the lateral wall part having an upper end exposed to the front side of the top button.

9. The mobile terminal according to claim 1, wherein the lower button is formed of a metallic material.

10. The mobile terminal according to claim 1, wherein the lower button includes a reflection layer configured to reflect light incident on a lower side of the light guide layer,
wherein the upper button is arranged on a top surface of the light guide layer to cover the light blocking part, and
wherein the upper button is formed of a metallic material.

11. The mobile terminal according to claim 1, further comprising:

a reflection dome comprising a concave reflection surface located in a central portion of the light guide layer; and a light channel extending from the concave reflection surface in a lateral direction.

* * * * *